(12) United States Patent
Myhre et al.

(10) Patent No.: US 6,642,323 B1
(45) Date of Patent: Nov. 4, 2003

(54) PROCESS TO PRODUCE A HOMOGENEOUS POLYETHYLENE MATERIAL

(75) Inventors: Ole Jan Myhre, Pregarten (AT); Bjarne Jansen, Porsgrunn (NO); Auli Nummila-Pakarinen, Porvoo (FI); Jari Äärilä, Porvoo (FI)

(73) Assignee: Borealis Technology Oy, Porvoo (FI)

( * ) Notice: Subject to any disclaimer, the term of this patent is extended or adjusted under 35 U.S.C. 154(b) by 0 days.

(21) Appl. No.: 09/674,912

(22) PCT Filed: May 10, 1999

(86) PCT No.: PCT/FI99/00391

§ 371 (c)(1),
(2), (4) Date: Nov. 8, 2000

(87) PCT Pub. No.: WO99/58583

PCT Pub. Date: Nov. 18, 1999

(30) Foreign Application Priority Data

May 8, 1998 (FI) .................................................. 981034

(51) Int. Cl.⁷ ................................................. C08F 2/34
(52) U.S. Cl. .......................... 526/64; 526/65; 526/201; 526/348.2; 526/348.5; 526/348.6; 526/901
(58) Field of Search ............................. 526/64, 65, 201, 526/348.2, 348.5, 348.6, 901

(56) References Cited

U.S. PATENT DOCUMENTS

| 5,326,835 A | 7/1994 | Ahvenainen et al. |
| 5,405,901 A | 4/1995 | Daniell et al. |
| 5,494,965 A | 2/1996 | Harlin et al. |
| 5,684,097 A | 11/1997 | Palmroos et al. |

FOREIGN PATENT DOCUMENTS

| EP | 0688794 | | 12/1995 |
| WO | WO9212182 | * | 7/1992 |
| WO | 9618677 | | 6/1996 |
| WO | 9726287 | | 7/1997 |

* cited by examiner

Primary Examiner—David W. Wu
Assistant Examiner—William Cheung
(74) Attorney, Agent, or Firm—Birch, Stewart, Kolasch & Birch, LLP

(57) ABSTRACT

The present invention concerns a process for producing homogeneous polyethylene compositions and processes for making high density, medium density and low density films therefrom. The process comprises carrying out the polymerization in the presence of an ethylene-polymerizing catalyst system in a multistage reaction sequence of successive polymerization stages, at least one of which is a loop polymerization stage, and at least one of which is a gas phase polymerization stage. According to the invention, said loop polymerization stage is operated using a diluent selected from the group of linear and branched $C_4$–$C_6$ hydrocarbons and/or mixtures thereof. The reactor sequence is operated with different amounts of hydrogen and comonomers to produce a high molecular weight portion in one of the polymerization stages and a low molecular weight portion in another, so as to provide bimodal polyethylene composition with a low molecular weight part having an $MFR_2$ of 250 g/10 min or more. The obtained material is homogenous and the fines level in the process is low.

48 Claims, No Drawings

PROCESS TO PRODUCE A HOMOGENEOUS POLYETHYLENE MATERIAL

BACKGROUND OF THE INVENTION

1. Field of the Invention

The present invention relates to a process for producing polyethylene compositions suitable for film-making. More particularly, the invention relates to polyethylene compositions with a good homogeneity and a low fines level in the polymer powder.

2. Description of Related Art

A number of processes designed to produce bimodal polyethylene are known in the art. Processes comprising two or more cascaded loop reactors are known to produce homogeneous polyethylene materials having a good processability in the end use applications. However, these processes have a limitation of only being able to produce bimodal polyethylenes having a relatively high density, higher than about 935 kg/m$^3$.

On the other hand, processes involving the use of two or more cascaded gas phase reactors are also known in the art. These processes have the advantage of being able to produce polyethylenes over a wide density range. However, the homogeneity and processability of the materials produced in this kind of processes have not been on such a level that they could seriously compete with the materials produced in the processes comprising cascaded slurry reactors.

A process comprising a cascade of a loop and a gas phase reactor is also known in the art. It is possible to produce polyethylenes over a fairly broad density range with this kind of a process. In addition, the polyethylenes produced with a loop-gas phase-process have a fairly good balance between processability and homogeneity. It has, however, occasionally been slightly problematic to produce very demanding materials having a good homogeneity. Typical examples of such materials are bimodal film materials, especially bimodal high density film or pipe material.

One problem typical for the production of bimodal polyethylene, especially in a case where the low molecular weight fraction is produced in the first polymerization stage, is the formation of fines. In the subsequent discussion, the term "fines" is used to designate the weight fraction of those polymer particles which pass a 105 $\mu$m sieve. If the fines are present in a high amount, they reduce the flowability of the powder. This may cause problems in some process stages, like in powder conveying and gas phase reactor. It has been found that the fine polymer is found already in the samples taken after the first polymerization stage, i.e., from the flash tank of the loop reactor. It also has been found that the level of fine polymer strongly depends on the MFR and density of the fraction produced in the loop reactor. The level of fines has been found to some extent to be influenced by prepolymerization and conditions employed in the prepolymerization reactor. The following table shows how the fines level is influenced by the MFR produced in the loop reactor and the prepolymerization conditions in a process where propane has been used as a diluent.

TABLE 1

Fines level after a pilot scale loop reactor at different MFR of loop material and different prepolymerization conditions

| Loop MFR$_2$ g/10 min | Fines, no prepolymerization % | Fines, no comonomer used in prepolymerization % | Fines, comonomer used in prepolymerization % |
|---|---|---|---|
| 150 | 15–25 | 10–12 | 5–10 |
| 500 | 24–30 | 16–20 | 9–12 |
| 1000 | | 17–23 | 10–15 |

Thus, when the MFR$_2$ of the polymer produced in the loop reactor is increased, the level of fine polymer increases also. The problem becomes apparent in the production of bimodal polyethylene; the fraction produced in the loop reactor of the polymer usually has an MFR$_2$ of about 300–800 g/10 min. As can be seen in Table 1, it is possible to reduce the level of fines by employing a prepolymerization stage and feeding a sufficient amount of comonomer into the prepolymerization reactor.

Processes for producing bimodal materials for high density PE film are known from e.g. EP-B-517868, EP-A-691353 and WO-A-9618662.

EP-B-517868

The patent discloses a process to produce bimodal polyethylene comprising a loop and a gas phase reactor. The publication teaches the use of different inert hydrocarbons as a diluent in the loop reactor, but it states that propane, especially in supercritical conditions, is preferred. The publication does not refer to the homogeneity of the film material nor discuss the possibilities to reduce the level of the fine polymer particles.

Example 6 of EP-B-517868 shows a process where isobutane has been used as a diluent and hexene as a comonomer. In the example, the material was further processed by extruding to pipes. It shows further that the MFR$_2$ of the material produced in the loop reactor was 140 g/10 min and the MFR$_5$ of the final product was 0.8 g/10 min. As already mentioned, the publication did not refer to the homogeneity of the product, but in general it can be stated that a material having such a high final MFR$_5$ and quite a low MFR$_2$ after the first polymerization stage, i.e., in the loop reactor, should not be difficult to homogenize. Thus, the example gives no indication whether a more difficult material having a lower final MFR$_5$ and a higher MFR$_2$ of the material produced in the loop reactor would be easier to homogenize than a corresponding material produced with a process where propane is used as a diluent.

WO-A-9618662

The patent application discloses a process comprising at least two loop reactors and at least one gas phase reactor. Again, the publication mentions that different inert hydrocarbons can be used as a diluent in the loop reactor, but that specifically propane especially in supercritical state is preferred. In the examples, only propane is used, and the obtained material is in some cases blown to film. The document does discuss both the homogeneity of the film material and the level of fine polymer, but teaches that the homogeneity can be improved and the fines level can be reduced by installing a prepolymeriser in the process.

EP-A-691353

The patent application discloses a process for producing an in situ blend of ethylene polymers giving a low gel film.

The process comprises two gas phase reactors. A copolymer with low MFR is made in the first reactor and a copolymer with high MFR is made in the second reactor.

EP-A-754708

The patent application discloses a process for producing an in situ polyethylene blend. The modality of the polymer is increased by adding into the first reactor a saturated alicyclic hydrocarbon, which is liquid at process conditions. The addition of the saturated alicyclic hydrocarbon reduced the gel level of the film made of the polymer.

SUMMARY OF THE INVENTION

It is an object of the present invention to eliminate the problems of the prior art and to provide a process for producing polyethylene materials over a wide density range. In particular, the invention aims at producing polyethylene materials having a good processability in the end use applications and an excellent homogeneity. Furthermore, it is an aim of the present invention to provide a process in which only minute amounts of fine polymer particles are produced.

It is a further object of the present invention to provide homogeneous films and pipe materials.

These and other objects, together with the advantages thereof over known processes and products, which shall become apparent from the specification which follows, are accomplished by the invention as hereinafter described and claimed.

According to the invention bimodal polyethylene materials having a very broad molecular weight distribution are prepared in at least two stages in a process comprising a cascade of one or more loop reactor(s) and one or more gas phase reactor(s). The present invention is based on the surprising finding that the homogeneity of the material can be improved by a proper selection of diluent used in the loop reactor. Equally surprisingly, also the level of fine polymer can be reduced at the same time.

The homogeneous material is preferably produced by polymerizing or copolymerizing ethylene in a reactor cascade formed by at least two reactors, one of which is a gas phase reactor, and one of which is a loop reactor, said loop reactor being operated with an inert hydrocarbon, namely linear or branched aliphatic $C_4$–$C_6$ hydrocarbon, as a diluent. The reactors are operated with different amounts of hydrogen and comonomers to produce a high molecular weight portion in one of the reactors and a low molecular weight portion in another so as to provide a bimodal polyethylene composition comprising a relatively low molecular weight part and a relatively high molecular weight part. The $MFR_2$ of the low molecular weight part is 250 g/10 min or more.

In particular, the present invention comprises a process to polymerise ethylene and comonomer(s) in at least two subsequent stages, of which (i) in the first stage, a low molecular weight, relatively high density polymer fraction having a melt flow rate $MFR_2$ of at least 250 g/10 min is prepared in one or more loop reactor(s) using linear or branched $C_4$–$C_6$ hydrocarbon as a diluent, and (ii) in the second stage a high molecular weight, relatively low density copolymer is produced in one or more gas phase reactor(s) using a higher olefin, like 1-butene, 1-hexene or 1-octene, as a comonomer. The polymerization conditions are selected to be such that the final polymer has a desired melt flow rate, preferably so that $MFR_5$ is at most 0.7 g/10 min.

The level of polymer fines after the loop reactor stage is less than 15 wt-%, preferably 10 wt-% or less and in particular 8 wt-% or less.

More specifically, the present process is characterized by what is stated in the characterizing part of claim 1.

The process for making HD polyethylene films is characterized by what is stated in the characterising part of claim 19.

The process for making medium density polyethylene films is characterized by what is stated in the characterising part of claim 21.

The process for making low density polyethylene films is characterized by what is stated in the characterising part of claim 22.

The advantage of the present invention is that it provides a material for making blown films with good mechanical properties and good appearance in a process where the whole range of PE products from LLD to HD can be produced. The material is comparable to that produced in cascaded loop reactors, allowing the production of HD products only.

By means of the invention it is possible to produce polyethylene material with improved homogeneity. The homogeneity measured from a pelletized sample of the final polyethylene composition is excellent. What is more, there is no need for a prepolymerization reactor, if it is not considered otherwise necessary. The homogeneity of the polymer materials is also manifested by their excellent performance under continuous, long time stress.

Furthermore, the process operation is easier with less fines present and the level of fine polymer in a process according to the present invention is lower than in a process where propane has been used as a diluent. It has been found that when producing a polymer having $MFR_2$ about 500 g/10 min in a loop reactor using isobutane as a diluent, the level of fines is about 4–8% in conditions where no comonomer is fed into the prepolymerization reactor, compared to 15–20% with a process where propane has been used as a diluent.

The tear strength, impact strength and processability on a film line make the present materials useful for production of thin films of thicknesses in the range of 5 μm, or even less than 5 μm, to over 30 μm. Films made from the materials also exhibit good barrier properties to water vapour.

Next, the invention will be more closely examined with the aid of the following detailed description.

DETAILED DESCRIPTION OF THE INVENTION

Definitions

For the purpose of the present invention "loop reactor" designates a reactor made of a conduit forming a closed loop and through which the polymer slurry, where the catalyst and the polymer produced in the reactor are suspended in a fluid phase consisting of diluent, monomer, possible comonomers and hydrogen. The fluid phase may also contain small amounts of additives, e.g. to reduce the static electricity. The reactor may be operated continuously or intermittently.

By "gas phase reactor" is meant any mechanically mixed or fluidized bed reactor, where polymer particles are suspended in a gas consisting of monomer, comonomer(s) and possibly hydrogen and/or inert gas. Preferably the gas phase reactor comprises a mechanically agitated fluidized bed reactor with gas velocity of at least 0.2 m/s.

"Melt flow rate", or abbreviated MFR, is a measure of the melt viscosity and thus also of the molecular weight of the polymer. A high value of MFR corresponds to a low molecular weight. It is measured by pressing the polymer melt through a standard cylindrical die at a standard temperature in a special measuring device (melt indexer) equipped with a standard piston under a standard load. For polyethylene, the melt flow rate is measured at 190° C. The abbreviation MFR is usually provided with a numerical subscript, which indicates the load under which the measurement was made. Thus, $MFR_2$ designates that the measurement was performed under 2.16 kg load and $MFR_{21}$ designates that the measurement was performed under 21.6 kg load. The determination of MFR is described e.g. in ISO 1133 C4, ASTM D 1238 and DIN 53735.

By "flow rate ratio", or abbreviated FRR, is meant a ratio between two MFR values measured from the same polymer using different loads. The abbreviation FRR is usually provided with a numerical subscript indicating which loads have been used to determine the FRR. Thus, $FRR_{21/2}$ has been calculated as the ratio of $MFR_{21}$ to $MFR_2$. The FRR is a measure of the broadness of the molecular weight distribution. A high FRR corresponds to broad molecular weight distribution.

By "fines", "polymer fines" or "fine polymer (particles)" is meant the smallest fraction of the polymer particles. In the present discussion, as fines are considered the particles which pass the US 140 sieve, or which pass the sieve having a screen size of about 105 microns. Typically the average particle size of the polymer particles coming out of the loop reactor is from 200 to 300 microns. The fines content, referred to also as "fines level", is given in weight-% of the total weight of polymer particles.

The complex viscosity at $G^*=5$ kPa, $\eta_{5\ kPa}$, is measured using a dynamic rheometer. It is the measure of the average molecular weight of the polymer.

The shear thinning index, $SHI_{5/300}$, is defined as the ratio of the viscosity at $G^*=5$ kPa to the complex viscosity at $G^*=300$ kPa. It is a measure of the molecular weight distribution.

The storage modulus, $G'_{5\ kPa}$, at the point where the loss modulus $G''$ has a specified value of 5 kPa, denoted as $G'_{5\ kPa}$, is also a measure of molecular weight distribution. It is sensitive to very high molecular weight polymer fraction.

The Polymer Composition

The present invention concerns a process for producing polyethylene compositions having a bimodal molar mass distribution comprising a relatively high molar mass portion and a relatively low molar mass portion.

The process is especially advantageous for producing ethylene (co)polymer compositions having a broad molecular weight distribution and a high average molecular weight, and in particular compositions which are used in applications where homogeneity is important, such as film or pipe. Typically, in these compositions the $MFR_2$ of the low molecular weight fraction is higher than 250 g/10 min.

The low molecular weight fraction of the polyethylene composition produced with a process according to the present invention has a $MFR_2$ of 250 g/10 min or more, preferably approximately 300–1000 g/10 min. The $MFR_{21}$ of the final polymer composition is 50 g/10 min or less. Alternatively or additionally the $MFR_5$ of the final composition is 0.7 g/10 min or less or the $MFR_{21}$ of the final polymer composition is 20 g/10 min or less.

The density of the low molecular weight fraction is typically 935 kg/m³ or more, in particular 935–980 kg/m³. The density of the final polymer composition can vary greatly, since polymer compositions with a density in the range of 915–965 kg/m³ can be produced with the process of the present invention.

The weight fraction of the low molecular weight material should be within 5–95% of the final polymer composition. Accordingly, the fraction having a relatively high molecular weight should have such average molecular weight and comonomer content that the final bimodal ethylene polymer or copolymer composition has the above-described melt flow rate and density.

According to a preferred embodiment, the ethylene polymer or copolymer composition produced with the process of the present invention comprises a low molecular weight part with a density above 960 kg/m³ and a high molecular weight part, said composition having a density of 940–965 kg/m³ and $MFR_{21}$ of 3–50 g/10 min, preferably 3–15 g/10 min.

The $SHI_{5/300}$ of the composition satisfies the relationship $$SHI_{5/300} \leq 0.00014 \cdot \eta_{5\ kPa} + 78,$$

and
$G'_{5\ kPa}$ satisfies the relationship $$G'_{5\ kPa} \geq 28 \cdot SHI_{5/300} + 425.$$

According to another preferred embodiment, the ethylene polymer or copolymer composition produced with the process according to the present invention comprises a low molecular weight fraction having a melt flow rate $MFR_2$ within 300–1000 g/10 min, preferably within 300–600 g/10 min and a density between 960–980 kg/m³. The weight fraction of the low molecular weight fraction is within 5–95%, preferably 20–55% and in particular 35–50% of the final polymer composition. The composition further comprises a high molecular weight fraction, and the final ethylene polymer or copolymer composition has a melt flow rate $MFR_{21}$ within 3–50 g/10 min, preferably within 3–15 g/10 min and a density within 940–965 kg/m³.

The composition described in either one of the two passages above is advantageously used to produce high density films. Typically, the film blown from said composition has a dart drop higher than 200 g, preferably over 450 g. The number of gels is typically lower than 50, preferably lower than 20 and in particular lower than 10 according to the gel determination method presented below.

According to yet another preferred embodiment, the ethylene polymer or copolymer composition produced with the process according to the present invention comprises a low molecular weight fraction having a melt flow rate $MFR_2$ within 250–1000 g/10 min, preferably within 300–600 g/10 min and a density between 940–980 kg/m³. The weight fraction of low molecular weight material is within 20–60%, preferably 30–50% and in particular 40–50% of the final polymer composition. Said composition further comprises a high molecular weight fraction. The final ethylene polymer or copolymer composition has a melt flow rate $MFR_{21}$ within 2–50 g/10 min, preferably within 3–15 g/10 min and density within 930–965 kg/m³. This kind of composition is advantageously used for manufacturing pipes.

According to another preferred embodiment of the invention, the ethylene polymer or copolymer composition produced with the process according to the present invention comprises a low molecular weight fraction having a melt flow rate $MFR_2$ of 250–1000 g/10 min, preferably 300–500 g/10 min and a density in the range of 940–980 kg/m³. The weight fraction of low molecular weight material within 5–95%, preferably 20–50% and in particular 35–50% of the final polymer composition. The composition further comprises a high molecular weight fraction. The final ethylene polymer or copolymer composition has a melt flow rate $MFR_{21}$ within 7–30 g/10 min, preferably within 10–25 g/10 min and a density within 925–940 kg/m³. This kind of composition is advantageously used for producing medium density films.

According to still another preferred embodiment of the invention, the ethylene polymer or copolymer composition produced with the process according to the present invention comprises a low molecular weight fraction having a melt flow rate $MFR_2$ of 250–1000 g/10 min, preferably 300–500 g/10 min an a density in the range of 935–960 kg/m³. The weight fraction of low molecular weight material within 5–95%, preferably 20–50% and in particular 35–50% of the final polymer composition. The composition further comprises a high molecular weight fraction. The final ethylene polymer or copolymer composition has a melt flow rate $MFR_{21}$ within 10–50 g/10 min, preferably within 15–25 g/10 min and a density within 915–930 kg/m³. This kind of composition is advantageously used for producing low density films.

In addition to the polyethylene compositions described above, it is clear that the process according to the present invention is also suitable for producing less demanding polyethylene materials having a narrower molecular weight distribution and/or a lower molecular weight.

Polymerization Process

To produce the polymer compositions, ethylene is polymerized in the presence of a suitable catalyst, preferably a Ziegler-Natta catalyst (cf. below) or a single-site catalyst, at an elevated temperature and pressure. Polymerization is carried out in a cascade comprising polymerization reactors selected from the group of loop and gas phase reactors.

In addition to the actual polymerization reactors used to produce the bimodal ethylene homo- or copolymer, the polymerization reaction system optionally comprises a number of additional reactors, such as prereactors. The prereactors include any reactor for prepolymerizing or precontacting the catalyst or modifying the olefinic feed, if necessary. All reactors of the reactor system are preferably arranged in a cascade.

In the following description the reactor system is described to comprise one loop reactor (referred to as "the first reactor") and one gas phase reactor (referred to as "the second reactor"), in that order. However, it should be understood that the reactor system can comprise the reactors in any number. In principle, the reactors can also be arranged in any order. The advantages of the improved processability become, however, more pronounced when the reactors are arranged so that the loop reactor(s) are first in the cascade. It is preferred to produce the low molecular weight part of the polymer composition in the loop reactor, and thus prior to the high molecular weight part of the composition.

In every polymerization step it is possible to use also comonomers selected from the group of $C_{4-10}$ olefins, such as 1-butene, 1-pentene, 1-hexene, 4-methyl-1-pentene, 1-heptene, 1-octene, 1-nonene and 1-decene. It is also possible to use two or more olefins selected from said group. Preferably a higher alpha-olefin, such as 1-butene, 1-hexene, 4-methyl-1-pentene or 1-octene is used. In particular, 1-hexene is preferred. It is to be understood that the comonomer used may be the same or different in the different reactors. Preferably, the comonomer is selected so that the boiling point of the comonomer is not close to the boiling point of the diluent, whereby the diluent recovery becomes more economical.

The use of comonomers is particularly preferred for the preparation of the high molar mass portion. The amount of comonomers in the present materials is generally 0 to 5 wt-%, preferably less than about 2 wt-%. The low molecular weight component contains less than about 1 wt-% comonomers.

According to the invention, the polymerization comprises the steps of subjecting ethylene, optionally hydrogen and/or comonomers to a first polymerization reaction in a first polymerization zone or reactor, recovering the first polymerization product from the first polymerization zone, feeding the first polymerization product to a second reaction zone or reactor, feeding additional ethylene and optionally hydrogen and/or comonomers to the second reaction zone, subjecting the additional ethylene and optional hydrogen and/or comonomer to a second polymerization reaction in the presence of the first polymerization product to produce a second polymerization product, and recovering the second polymerization product from the second reaction zone.

Thus, in the first step of the process, ethylene with the optional comonomer(s) together with the catalyst is fed into the first polymerization reactor. Along with these components hydrogen as a molar mass regulator is fed into the reactor in the amount required for achieving the desired molar mass of the polymer. Alternatively, the feed of the first reactor can consist of the reaction mixture from a previous reactor, if any, together with added fresh monomer, optional hydrogen and/or comonomer and cocatalyst. In the presence of the catalyst, ethylene and the optional comonomer will polymerize and form a product in particulate form, i.e. polymer particles, which are suspended in the fluid circulated in the reactor.

The polymerization medium typically comprises the monomer (i.e. ethylene) and/or a hydrocarbon diluent, and optionally hydrogen and/or comonomers. According to the invention, the hydrocarbon diluent mainly comprises a $C_4$–$C_6$ aliphatic linear or branched hydrocarbon or a mixture of two or more of these. Thus, the diluent can be selected from a group comprising n-butane, isobutane, n-pentane, 2-methyl butane, 2,2-dimethyl propane, hexane, 2-methyl pentane, 3-methyl pentane, 2,2-dimethyl butane, 2,3-dimethyl butane and 2-ethyl butane. Preferred of these are n-butane, isobutane, pentane and hexane. It should be noted, that the diluent may also contain minor amounts of lighter and/or heavier hydrocarbons which are typically found in industrially used hydrocarbon fractions. It is preferred to use light diluents, such as n-butane or isobutane, since these can readily be separated from the polymer.

According to a preferred embodiment, the inert hydrocarbon used in the loop reactor is isobutane, n-butane or isopentane.

The polymer is circulated continuously through the loop reactor by means of a circulation pump or by other means of circulation.

The conditions of the loop reactor are selected so that at least 5 wt-%, preferably at least 20 wt-%, most preferably at least 35 wt-%, of the whole production is produced in the loop reactor(s). The temperature is in the range of 40 to 110° C., preferably in the range of 70 to 100° C. The reaction pressure is in the range of 25 to 100 bar, preferably 35 to 80 bar.

In loop polymerization more than one reactor can be used in series. In such a case the polymer suspension in an inert hydrocarbon produced in the loop reactor is fed without separation of inert components and monomers either intermittently or continuously to the following loop reactor, which is operated at a lower pressure than the previous loop reactor.

The polymerization heat is removed by cooling the reactor by a cooling jacket. The residence time in the loop reactor must be at least 10 minutes, preferably 20–100 min for obtaining a sufficient yield of polymer.

As discussed above, hydrogen is fed into the reactor to control the molecular weight of the polymer. Hydrogen is added to the reactor so that the molar ratio of hydrogen to ethylene in the fluid phase of the reactor is at least 100 mol $H_2$/kmol ethylene, preferably 300–600 mol $H_2$/kmol ethylene. It should be noted that the exact amount of hydrogen depends on the desired molecular weight (or MFR) of the polymer produced in the first stage, and thus no exact value can be given.

Comonomer can be introduced into the loop reactor to control the density of the polymer produced in the first polymerization stage. If the final ethylene (co)polymer should have a high density above 940 kg/m$^3$, the molar ratio of the comonomer to the ethylene should be at most 200 mol comonomer/kmol ethylene. If the final ethylene (co)polymer should have a low density below 930 kg/m$^3$, the molar ratio of the comonomer to the ethylene should be between 200–1000 mol comonomer/kmol ethylene, preferably between 300–800 mol comonomer/kmol ethylene. Again, it should be noted that the exact amount of comonomer depends on the desired comonomer content (or density) of the polymer produced in the first stage, and thus no exact value can be given.

The pressure of the first polymerization product including the reaction medium is reduced after the first reaction zone in order to evaporate volatile components of the product, e.g. in a flash tank. As a result of the flashing, the product stream containing the polyethylene is freed from hydrogen and can be subjected to a second polymerization in the presence of additional ethylene to produce a high molar mass polymer.

After the loop reaction zone, the level of polymer fines is typically less than 15 wt-%, preferably 10 wt-% or less, and in particular 8 wt-% or less. The average particle size of the polymer discharged from the loop reactor is 0.2–0.3 mm.

The second reactor is preferably a gas phase reactor, wherein ethylene and preferably comonomers are polymerized in a gaseous reaction medium.

The gas phase reactor is typically an ordinary fluidized bed reactor, although other types of gas phase reactors can be used. In a fluidized bed reactor, the bed consists of the growing polymer particles from the first reaction zone and/or the polymer particles formed in the bed of the gas phase reactor, as well as the active catalyst which is dispersed within the growing polymer particles. The bed is kept in a fluidized state by introducing gaseous components, for instance monomer on a flowing rate which will make the particles act as a fluid. Typically fluidizing gas is introduced into the bed from the bottom through a fluidization grid. The fluidizing gas consists of monomer and optionally comonomer(s) and/or hydrogen and/or inert gases, like nitrogen, propane, n-butane or isobutane. The fluidizing gas can contain also inert carrier gases, like nitrogen and propane and also hydrogen as a molecular weight modifier. The fluidized gas phase reactor can be equipped with a mechanical mixer.

In order to produce the high molecular weight component in the gas phase reactor, hydrogen can be added into the reactor to control the molecular weight of the final polymer. The concentration of hydrogen in the fluidizing gas shall be such that the molar ratio of hydrogen to ethylene is lower than 100 mol hydrogen/kmol ethylene, preferably lower than 50 mol/kmol. It should be noted that the exact amount of hydrogen depends on the desired MFR of the final ethylene (co)polymer, and thus no exact value can be given.

Comonomer can also be introduced into the gas phase reactor to control the density of the final ethylene (co) polymer. For example, if the final ethylene (co)polymer should have a high density above 940 kg/m$^3$, the molar ratio of the comonomer to the ethylene should be at most 400 mol comonomer/kmol ethylene. If the final ethylene (co)polymer should have a low density below 930 kg/m$^3$, the molar ratio of the comonomer to the ethylene should be between 200–1000 mol comonomer/kmol ethylene, preferably between 300–800 mol comonomer/kmol ethylene. Again, it should be noted that the exact amount of comonomer depends on the desired comonomer content or density of the final ethylene (co)polymer, and thus no exact value can be given.

The gas phase reactor used can be operated in the temperature range of 50 to 115° C., preferably between 60 and 110° C. The reaction pressure is typically between 10 and 40 bar and the partial pressure of monomer between 1 and 20 bar.

The pressure of the second polymerization product including the gaseous reaction medium can then be released after the second reactor in order optionally to separate part of the gaseous and possible volatile components of the product, e.g. in a flash tank. The overhead stream or part of it is recirculated to the gas phase reaction zone.

The production split between the relatively high molar mass polymerization reactor and the relatively low molar mass polymerization reactor is 5–95:95–5. Preferably, 20 to 50%, in particular 35 to 50%, of the ethylene homopolymer or copolymer is produced at conditions to provide a polymer having a MFR$_2$ of 250 g/10 min or more and constituting the low molar mass portion of the polymer, and 95 to 50%, in particular 90 to 50%, of the ethylene homopolymer or preferably copolymer is produced at such conditions that the final polymer has an MFR$_{21}$ of 50 g/10 min or less, in particular about 3 to 50 g/10 min and constituting the high molar mass portion of the polymer.

Catalyst

Any known Ziegler-Natta type catalyst can be used in the process. The catalyst can be supported on an inert carrier or it can be non-supported. If a supported catalyst is used, it can be supported on any suitable carrier known in the art, in particular a metal oxide or a metal oxide mixture, such as silica, alumina, silica-alumina and silica-titania.

Preferred catalysts comprise titanium tetrachloride on silica or alumina, wherein the support optionally contains magnesium chloride and optionally has been pretreated with an organometal complex. An example of a suitable catalyst is disclosed in WO 95/35323.

Blending and Compounding

The polymer obtained from the reactor is in the form of a powder. Generally, film blowers are not capable of using the polymer in powder form. The powder is therefore transformed to pellets in a compounding step where the polymer is first mixed with additives, like antioxidants and process stabilisers, then melt homogenised in an extruder and finally pelletised.

The extruder used in the compounding can be of any type known in the art. It may be either a single screw extruder which contains only one screw or a twin screw extruder which contains two parallel screws, or a combination of these. Preferably a twin screw extruder is used.

The twin screw extruder may be of either corotating or counterrotating type. In a corotating twin screw extruder the screws rotate in the same direction while in a counterrotating twin screw extruder the screws rotate in the opposite directions. The counterrotaing twin screw extruder has the advantage of giving better homogeneity on a certain level of specific energy input. On the other hand, corotating twin screw extruder generally degrades the polymer less on a certain level of specific energy input.

The films are prepared by running the pelletized product into a film on a film line. The die diameter is typically 100–300, in particular 140–200 mm and the die gap is 1–2 mm, for HD films typically approximately 1.5 mm. The blow-up ratio (BUR), which is the ratio of the diameter of the expanded film bubble to the die diameter, may be 1–10, typically between 2 and 4 and for HD films in particular 4. For HD films the frost line height is usually 5–10 die diameters (DD) and for LLD films between 0 and 4, in particular 2 and 4 DD. Preferably, the material exhibits a neck contraction, so that the effective blow-up ratio ($BUR_{eff}$), which is the ratio of the diameter of the expanded film bubble to the narrowest diameter of the neck, exceeds the BUR based on the die diameter. Thus, if BUR is about 4, then $BUR_{eff}$ is preferably higher than 5. The thickness of the films prepared according to the present invention is typically 3 μm–100 μm. It is thus possible to make thin films of 3–50 μm, in particular 5–30 μm.

The film prepared from the material produced by the process described above has a dart drop of more than 200 g, preferably more than 450 g, tear strength in machine and transverse directions at least 0.2 N, preferably at least 0.4 N, and at least 0.5 N, preferably 0.6 N or more, respectively. The good homogeneity is manifested by the low amount of gels in an area of A4-size; typically the films prepared according to the invention exhibit gels less than 50, preferably less than 20 and in particular 10 or less in an area of A4 size.

The following non-limiting examples illustrate the invention:

Description of Analytical Methods

Fines and Average Particle Size

The fines level and average particle size were determined by sieving the polymer using a standard sieve set. The polymer passing US 140 sieve which has screen size of 105 microns was considered as fines.

Dart Drop

Dart drop is measured using the ISO 7765-1 method. A dart with a 38 mm diameter hemispherical head is dropped from a height of 0.66 m onto a film clamped over a hole. If the specimen fails, the weight of the dart is reduced and if it does not fail the weight is increased. At least 20 specimen need to be tested. A weight resulting failure of 50% of the specimen is calculated.

Tear Strength

Tear strength is measured using ISO 6383 method. The force required to propagate tearing across a film specimen is measured using a pendulum device. The pendulum swings by gravity through an arc, tearing the specimen from a precut slit. The specimen is held on one side by the pendulum and on the other side by a stationary member. Tear strength is the force required to tear the specimen.

Gel Count

The gel count was determined manually. The film sample (of size A4) was investigated under a polarised light. The gels were then marked and counted. The number of gels per A4 size was then given as the result.

White Spots (ISO-rating)

The dispersion was measured from cut pellets by optical microscopy using ISO/DIS11420v.

CTL

Resistance to constant tensile load (CTL) was measured using ISO 6252. The notched specimen is placed into a solution containing surface active agent under constant load and constant temperature. The result of the test is the time, after which the specimen breaks.

Rheological Measurements

The rheology of polymers has been determined using Rheometrics RDA II Dynamic Rheometer. The measurements have been carried out at 190° C. temperature under nitrogen atmosphere. The measurements give storage modulus (G') and loss modulus (G") together with absolute value of complex viscosity ($\eta^*$) as a function of frequency ($\omega$) or absolute value of complex modulus ($G^*$).

$$\eta^* = \sqrt{(G'^2 + G''^2)}/\omega$$

$$G^* = \sqrt{(G'^2 + G''^2)}$$

According to Cox-Merz rule complex viscosity function, $\eta^*(\omega)$ is the same as conventional viscosity function (viscosity as a function of shear rate), if frequency is taken in rad/s. If this empiric equation is valid absolute value of complex modulus corresponds shear stress in conventional (that is steady state) viscosity measurements. This means that function $\eta^*(G^*)$ is the same as viscosity as a function of shear stress.

In the present method viscosity at a low shear stress or $\eta^*$ at a low $G^*$ (which serve as an approximation of so called zero viscosity) is used as a measure of average molecular weight. On the other hand, shear thinning, that is the decrease of viscosity with $G^*$, gets more pronounced the broader is molecular weight distribution. This property can be approximated by defining a so called shear thinning index, SHI, as a ratio of viscosities at two different shear stresses.

Thus:

$$SHI_{5/300} = \eta^*_5 / \eta^*_{300}$$

wherein $\eta^*_5$ is complex viscosity at $G^* = 5$ kPa and $\eta^*_{300}$ is complex viscosity at $G^* = 300$ kPa As mentioned above storage modulus function, $G'(\omega)$, and loss modulus function, $G''(\omega)$, are obtained as primary functions from dynamic measurements. The value of the storage modulus at a specific value of loss modulus increase with broadness of molecular weight distribution. However this quantity is highly dependent on the shape of molecular weight distribution of the polymer.

EXAMPLES

Example 1

A pilot plant comprising a loop and a gas phase reactor was operated as follows: 23 kg/h isobutane and 11 g/h of a polymerization catalyst prepared according to Example 3 of WO95/35323 were introduced into a 50 dm³ loop reactor operated at 75° C. temperature and 57 bar pressure. In addition ethylene was fed so that its ratio to the catalyst was 150 g/g, 1-hexene so that its ratio to the ethylene was 80 g/kg and hydrogen so that its ratio to the isobutane diluent was 0.05 g/kg.

The slurry was discharged from the reactor and introduced into a 500 dm³ loop reactor operated at 95° C. temperature and 50 bar pressure. Additional ethylene, isobutane and hydrogen were introduced to obtain polyethylene having $MFR_2$ 550 g/10 min and polymerization rate 25 kg/h. The fines level after the loop reactor was 3.2% and the average particle size was 0.25 mm.

The polymer slurry was discharged from the loop and the hydrocarbons were removed in a flash tank. The polymer was then introduced into a gas phase reactor operated at 75° C. temperature and 20 bar pressure. Additional ethylene, 1-hexene and hydrogen were introduced so that the polymerization rate was 35 kg/h and the density and melt flow rate were on the desired level. The polymer was then discharged from the reactor, dried and pelletized. The $MFR_{21}$ of the final product was 4.7 g/10 min and the density was 945 kg/m³.

The pelletized product was then run into a film on a film line having die diameter 160 mm and die gap 1.5 mm. The blow-up ratio (BUR) was 4 and the frost line height equal to 8 die diameters (DD). The resulting film had neck of 125 mm (corresponding to an effective blow-up ratio $BUR_{eff}$ of 5.1), dart drop of 520 g, tear strength in machine and transverse directions 0.41 and 0.6 N respectively and 4 gels in an area of A4-size.

Example 2

The process of Example 1 was repeated, except that the production rate of polymer in the loop reactor was 30 kg/h and the $MFR_2$ of the polymer produced in the loop reactor was 700 g/10 min. The fines level in the polymer collected after the loop reactor was 4.0%. Polymer was withdrawn from the gas phase reactor at a rate of 69 kg/h. Thus, the production split between the loop and the gas phase reactors was 45/55. The $MFR_{21}$ of the final pelletized polymer was 12 g/10 min and the density was 949 kg/m³. Some of the powder was collected, blended with a Carbon black masterbatch and pelletized on a 25 mm Berstorff ZE25 extruder so that the melt temperature was about 265° C., to colour the resin black. The homogeneity of the material was evaluated by cutting the sample of pellets and measuring the dispersion by using an optical microscope. The ISO-rating was found to be 0.8, i.e., the material was extremely homogeneous having only a very small number of very small white dots.

A test specimen made of the material was placed in a CTL testing apparatus under 5.5 MPa load. After 580 hours the specimen was still unbroken.

Comparative Example 1

A pilot plant comprising a loop and a gas phase reactor was operated as follows: 27 kg/h propane and 15 g/h of the same polymerization catalyst that was used in Example 1 were introduced into a 50 dm³ loop reactor operated at 60° C. temperature and 65 bar pressure. In addition ethylene was fed so that its ratio to the catalyst was 100 g/g, 1-butene so that its ratio to the ethylene was 100 g/kg and hydrogen so that its ratio to the propane diluent was 0.14 g/kg.

The slurry was discharged from the reactor and introduced into a 500 dm³ loop reactor operated at 95° C. temperature and 60 bar pressure. Additional ethylene, propane and hydrogen were introduced to obtain polyethylene having $MFR_2$ 380 g/10 min and polymerization rate 28 kg/h. The fines level after the loop reactor was 11.2% and the average particle size was 0.24 mm.

The polymer slurry was discharged from the loop and the hydrocarbons were removed in a flash tank. The polymer was then introduced into a gas phase reactor operated at 75° C. temperature and 20 bar pressure. Additional ethylene, 1-butene and hydrogen were introduced so that the polymerization rate was 39 kg/h and the density and melt flow rate were on the desired level. The polymer was then discharged from the reactor, dried and pelletized. The $MFR_{21}$ of the final product was 9.7 g/10 min and the density was 945 kg/m³.

The pelletized product was then run into a film as disclosed in Example 1. The film had neck of 135 mm (corresponding to an effective blow-up ratio $BUR_{eff}$ of 4.7), dart drop of 170 g, tear strength in machine and transverse directions 0.15 and 0.45 N respectively and 220 gels in an area of A4-size.

Comparative Example 2

A unimodal material produced using a Cr-catalyst (sold by Borealis under a trade name HE6960) was run into a film in a similar fashion than in Example 1. The material had $MFR_{21}$ 8 g/10 min and density 945 kg/m³.

The resulting film had neck of 110 mm (corresponding to an effective blow-up ratio $BUR_{eff}$ of 5.8), dart drop of 150 g, tear strength in machine and transverse directions 0.2 and 0.5 N respectively and 10 gels in an area of A4-size.

Comparative Example 3

The process of Comparative Example 1 was repeated, except that the ratio of feeds of 1-butene to feed of ethylene into the prepolymerization stage was 40 g/kg and the ratio of ethylene to catalyst feed was into the prepolymerization stage was 200 g/g. The production rate of polymer in the loop reactor was 26 kg/h and the $MFR_2$ of the polymer produced in the loop reactor was 450 g/10 min. The fines level of the polymer collected after the loop reactor was 17%. Polymer was withdrawn from the gas phase reactor at a rate of 59 kg/h. Thus the production split between the loop and the gas phase reactor was 45/55. The $MFR_{21}$ of the final pelletized polymer was 12 g/10 min and the density was 948 kg/m³. Some of the powder was collected, blended with a Carbon black masterbatch and pelletized on a 25 mm Berstorff ZE25 extruder so that the melt temperature was about 225° C., so that the resin was coloured black. The homogeneity of the material was evaluated in a similar manner as in Example 2. The ISO-rating was found to be 1.6, meaning that the material was homogeneous with a small number of fairly small white-dots.

A test specimen made of the material was placed in a CTL testing apparatus under 5.5 Mpa load. After 200 hours the specimen had failed.

What is claimed is:

1. A process for producing a polyethylene composition in the presence of an ethylene-polymerizing catalyst system in a multistage reaction sequence of successive polymerization stages, at least one of which is a loop polymerization stage and at least one of which is a gas phase polymerization stage, wherein the level of fines produced in said loop polymerization stage is less than 15 wt %, and said loop polymerization stage being operated with an inert diluent selected from the group of linear and branched $C_4$–$C_6$ hydrocarbons and/or mixtures thereof, said reactor sequence being operated with different amounts of hydrogen and comonomers to produce a high molecular weight portion in one of the polymerization stages and a low molecular weight portion in another so as to provide a bimodal high density polyethylene with a low molecular weight part having a $MFR_2$ of 250 g/10 min or more.

2. The process according to claim 1, comprising
   subjecting ethylene, optionally together with hydrogen and/or comonomers, in the presence of a hydrocarbon diluent selected from the group of linear and branched $C_4$–$C_6$ hydrocarbons to a loop polymerization or copolymerization reaction in a first reaction zone or reactor to produce a polymer having a $MFR_2$ of 250 g/10 min or more, recovering the first polymerization product from the first polymerization zone, feeding the first polymerization product to a gas phase zone or reactor, feeding additional ethylene and optionally hydrogen and/or comonomers to the gas phase reaction zone, subjecting the additional ethylene and optionally additional monomer(s) and hydrogen to a second polymerization reaction in the presence of the first polymerization product to produce a second polymerization product having a $MFR_{21}$ of 50 g/10 min or less, and recovering the combined polymerization product from the gas phase reaction zone.

3. The process according to claim 1 or 2, wherein the level of polymer fines after the loop reactor stage is up to and including 10 wt-%.

4. The process according to claim 1, wherein the hydrocarbon diluent is isobutane, n-butane, pentane or hexane and/or mixtures thereof.

5. The process according to claim 1, wherein the comonomer is a $C_{4-10}$ olefin.

6. The process according to claim 1, wherein the density of the low molecular weight part is 960–980 kg/m$^3$ and true density of the final polymer composition is 940–965 kg/m$^3$.

7. The process according to claim 6, wherein the $MFR_2$ of the low molecular weight component is 300–1000 g/10 min and the $MFR_{21}$ of the final polymer composition is 3–50 g/10 min.

8. The process according to claim 6 or 7, wherein 5 to 95 wt-% of the ethylene homopolymer or copolymer is produced at conditions which provide a polymer having a $MFR_2$ of 300–1000 g/min.

9. The process according to claim 1, wherein the density of the low molecular weight part is 940–980 kg/m$^3$ and the density of the final polymer composition is 930–965 kg/m$^3$.

10. The process according to claim 9, wherein the $MFR_2$ of the low molecular weight part is 250–1000 g/10 min and the $MFR_{21}$ of the final polymer composition is 2–50 g/10 min.

11. The process according to claim 9 or 10, wherein 20–60 wt-% of the ethylene homopolymer or copolymer is produced at conditions to provide a polymer having a $MFR_2$ of 250–1000 g/10 min.

12. The process according to claim 1, wherein the density of the low molecular weight part is 940–980 kg/m$^3$ and the density of the final polymer composition is 925–940 kg/m$^3$.

13. The process according to claim 12, wherein the $MFR_2$ of the low molecular weight component is 250–1000 g/10 min and the $MFR_{21}$ of the final polymer composition is 7–30 g/10 min.

14. The process according to claim 12 or 13, wherein 5–95 wt-% of the ethylene homopolymer or copolymer is produced at conditions to provide a polymer having a $MFR_2$ of 250–1000 g/10 min.

15. The process according to claim 1, wherein the density of the low molecular part is 935–960 kg/m$^3$ and the density of the final polymer composition is 915–930 kg/m$^3$.

16. The process according to claim 15, wherein the $MFR_2$ of the low molecular part is 250–1000 g/10 min and the $MFR_{21}$ of the final polymer composition is 10–50 g/10 min.

17. The process according to claim 15 or 16, wherein 5–95 wt-% of the ethylene homopolymer or copolymer is produced at conditions to provide a polymer having a $MFR_2$ of 250–1000 g/10 min.

18. The process according to claim 1, wherein the final polymer composition has a $MFR_2$ of 0.7 or less.

19. A process for producing high density polyethylene films, comprising producing a polyethylene composition in the presence of an ethylene-polymerizing catalyst system in a multi-stage reaction sequence of successive polymerization stages, at least one of which is a loop polymerization stage and at least one of which is a gasp polymerization stage, wherein the level of fines produced in said loop polymerization stage is less than 15 wt %, and said loop polymerization stage being operated with an inert diluent selected from linear or branched $C_4$–$C_6$ hydrocarbon(s), said reactor sequence being operated with different amounts of hydrogen and comonomers to produce a high molecular weight portion in one of the polymerization stages and a low molecular weight portion in another so as to provide a bimodal high density polyethylene with a low molecular weight part having a density above 960 kg/m$^3$ and a $MFR_2$ of 250 g/10 min or more, and a high molecular weight part, the composition having a density of 940–965 kg/m$^3$ and $MFR_{21}$ of 3–50 g/10 min, and blowing said polyethylene composition to a film.

20. The process according to claim 19, wherein the hydrocarbon diluent is isobutane, n-butane or isopentane.

21. A process for preparing medium density polyethylene films, comprising producing a polyethylene composition in the presence of an ethylene-polymerizing catalyst system in a multi-stage reaction sequence of successive polymerization stages, at least one of which is a loop polymerization stage and at least one of which is a gas phase polymerization stage, wherein the level of fines produced in said loop polymerization stage is less than 15 wt %, and said loop polymerization stage being operated with a diluent selected from linear or branched $C_4$–$C_6$ hydrocarbon(s), said reactor sequence being operated with different amounts of hydrogen and comonomers to produce a high molecular weight portion in one of the polymerization stages and a low molecular weight portion in another so as to provide a bimodal medium density polyethylene with a low molecular weight part having a density of 940–980 kg/m$^3$ and a high molecular weight part, the composition having a density of 925–940 kg/m$^3$ and $MFR_{21}$ of 7–30 g/10 min, and blowing said polyethylene composition to a film.

22. A process for preparing low density polyethylene films, comprising producing a polyethylene composition in the presence of an ethylene-polymerizing catalyst system in a multi-stage reaction sequence of successive polymerization stages, at least one of which is a loop polymerization stage and at least one of which is a gas phase polymerization stage, wherein the level of fines produced in said loop polymerization stage is less than 15 wt %, and said loop polymerization stage being operated with a diluent selected from linear or branched $C_4$–$C_6$ hydrocarbon(s), said reactor sequence being operated with different amounts of hydrogen and comonomers to produce a high molecular weight portion in one of the polymerization stages and a low molecular weight portion in another so as to provide a bimodal low density polyethylene with a low molecular weight part having a density of 935–960 kg/m$^3$ and a $MFR_2$ of 250 g/10 min or more, and a high molecular weight part, the polyethylene composition having a density of 915–930 kg/m$^3$ and $MFR_{21}$ of 10–50 g/10 min, and blowing said polyethylene composition to a film.

23. The process according to any one of claims 19 22, wherein the film exhibits a number of gels lower than 50 in an area of A4 size.

24. A process for producing high density polyethylene films, comprising
producing a polyethylene composition in the presence of an ethylene-polymerizing catalyst system in a multi-stage reaction sequence of successive polymerization stages, at least one of which is a loop polymerization stage and at least one of which is a gas phase polymerization stage, wherein the level of fines produced in said loop polymerization stage is less than 15 wt %, and said loop polymerization stage being operated with an inert diluent selected from linear or branched $C_4$–$C_6$ hydrocarbons, said reactor sequence being operated with different amounts of hydrogen and comonomers to produce a high molecular weight portion in one of the polymerization stages and a low molecular weight portion in another so as to provide a bimodal high density polyethylene with a low molecular weight part having a density above 960 kg/m$^3$ and an $MFR_2$ of 250 g/10 min or more and a high molecular weight part, the composition having a density of 940–965 kg/m$^3$ and $MFR_{21}$ of 3–50 g/10 min, and
blowing said polyethylene composition to a film, said film exhibiting
a number of gels lower than 10 in an area of A4 size, and
a dart drop, measured using the ISO 7765-1 method, higher than 200 g.

25. A process for producing medium density polyethylene films, comprising
producing a polyethylene composition in the presence of an ethylene-polymerizing catalyst system in a multi-stage reaction sequence of successive polymerization stages, at least one of which is a loop polymerization stage and at least one of which is a gas phase polymerization stage, wherein the level of fines produced in said loop polymerization stage is less than 15 wt %, and said loop polymerization stage being operated with an inert diluent selected from linear or branched $C_4$–$C_6$ hydrocarbons, said reactor sequence being operated with different amounts of hydrogen and comonomers to produce a high molecular weight portion in one of the polymerization stages and a low molecular weight portion in another so as to provide a bimodal high density polyethylene with a low molecular weight part having a density above 940–980 kg/m$^3$ and an $MFR_2$ of 250 g/10 min or more and a high molecular weight part, the composition having a density of 925–940 kg/m$^3$ and $MFR_{21}$ of 7–30 g/10 min, and
blowing said polyethylene composition to a film, said film exhibiting
a number of gels lower than 10 in an area of A4 size, and
a dart drop, measured using the ISO 7765-1 method, higher than 200 g.

26. A process for producing low density polyethylene films, comprising
producing a polyethylene composition in the presence of an ethylene-polymerizing catalyst system in a multi-stage reaction sequence of successive polymerization stages, at least one of which is a loop polymerization stage and at least one of which is a gas phase polymerization stage, wherein the level of fines produced in said loop polymerization stage is less than 15 wt %, and said loop polymerization stage being operated with a diluent selected from linear or branched $C_4$–$C_6$ hydrocarbons, said reactor sequence being operated with different amounts of hydrogen and comonomers to produce a high molecular weight portion in one of the polymerization stages and a low molecular weight portion in another so as to provide a bimodal high density polyethylene with a low molecular weight part having a density above 935–960 kg/m$^3$ and an $MFR_2$ of 250 g/10 min or more and a high molecular weight part, the composition having a density of 915–930 kg/m$^3$ and $MFR_{21}$, of 10–50 g/10 min, and
blowing said polyethylene composition to a film, said film exhibiting
a number of gels lower than 10 in an area of A4 size, and
a dart drop, measured using the Isb 7765-1 method, higher than 200 g.

27. The process according to claim 19, wherein the polyethylene composition is compounded and pelletized prior to blowing it to a film.

28. The process according to claim 19, wherein the thickness of film is 5–100 $\mu$m.

29. The process according to claim 19, wherein the film has a dart drop, measured using the ISO 7765-1 method, higher than 200 g.

30. A method for reducing the level of fine polymer in a process in which ethylene is polymerized in the presence of an ethylene-polymerizing catalyst system in a multistage reaction sequence of successive polymerization stages, at least one of which is a loop polymerization stage and at least one of which is a gas phase polymerization stage, wherein the level of fines produced in said loop polymerization stage is less than 15 wt %, and said loop polymerization stage being operated with an inert diluent, said reactor sequence being operated with different amounts of hydrogen and comonomers to produce a high molecular weight portion in one of the polymerization stages and a low molecular weight portion in another so as to provide a bimodal polyethylene composition having a $MFR_{21}$ of 3–50 g/10 min, the low molecular weight part having a $MFR_2$ of 250 g/10 min or more, wherein the diluent is selected from the group of linear and branched $C_4$–$C_6$ hydrocarbons and/or mixtures thereof.

31. The process according to claim 3, wherein the level of polymer fines after the loop reactor stage is 8 wt-% or less.

32. The process according to claim 5, wherein the comonomer is at least one selected from the group consisting of 1-butene, 1-hexene, 4-methyl-1-pentene and 1-octene.

33. The process according to claim 7, wherein the $MFR_2$ of the low molecular weight component is 300–600 g/10 min and the $MFR_{21}$ of the final polymer composition is 3–15 g/10 min.

34. The process according to claim 8, wherein 20–55 wt-% of the ethylene homopolymer or copolymer is produced at conditions which provide a polymer having a $MFR_2$ of 300–1000 g/10 min.

35. The process according to claim 8, wherein 35–50 wt-% of the ethylene homopolymer or copolymer is produced at conditions which provide a polymer having a $MFR_2$ of 300–1000 g/10 min.

36. The process according to claim 10, wherein the $MFR_2$ of the low molecular weight part is 300–600 g/10 min and the $MFR_{21}$ of the final polymer composition is 3–15 g/10 min.

37. The process according to claim 11, wherein 30–50 wt-% of the ethylene homopolymer or copolymer is produced at conditions to provide a polymer having a $MFR_2$ of 250–1000 g/10 min.

38. The process according to claim 11, wherein 40–50 wt-% of the ethylene homopolymer or copolymer is produced at conditions to provide a polymer having a $MFR_2$ of 250–1000 g/10 min.

39. The process according to claim 13, wherein the $MFR_2$ of the low molecular weight component is 300–500 g/10 min and the $MFR_{21}$ of the final polymer composition is 10–25 g/10 min.

40. The process according to claim 14, wherein 20–50 wt-% of the ethylene homopolymer or copolymer is produced at conditions to provide a polymer having a $MFR_2$ of 250–1000 g/10 min.

41. The process according to claim 14, wherein 35–50 wt-% of the ethylene homopolymer or copolymer is produced at conditions to provide a polymer having a $MFR_2$ of 250–1000 g/10 min.

42. The process according to claim 16, wherein the $MFR_2$ of the low molecular part is 300–500 g/10 min and the $MFR_{21}$ of the final polymer composition is 15–25 g/10 min.

43. The process according to claim 17, wherein 20–50 wt-% of the ethylene homopolymer or copolymer is produced at conditions to provide a polymer having a $MFR_2$ of 250–1000 g/10 min.

44. The process according to claim 17, wherein 35–50 wt-% of the ethylene homopolymer or copolymer is produced at conditions to provide a polymer having a $MFR_2$ of 250–1000 g/10 min.

45. The process according to claim 23, wherein the film exhibits a number of gels lower than 20 in an area of A4 size.

46. The process according to claim 23, wherein the film exhibits a number of gels lower than 10 in an area of A4 size.

47. The process according to claim 28, wherein the thickness of the film is 5–30 µm.

48. The process according to claim 29, wherein the film has a dart drop, measured using the ISO 7765-1 method, higher than 450 g.

* * * * *